July 9, 1929.  W. J. GAGNON  1,720,472
CHAIN COUPLING
Filed Dec. 27, 1928
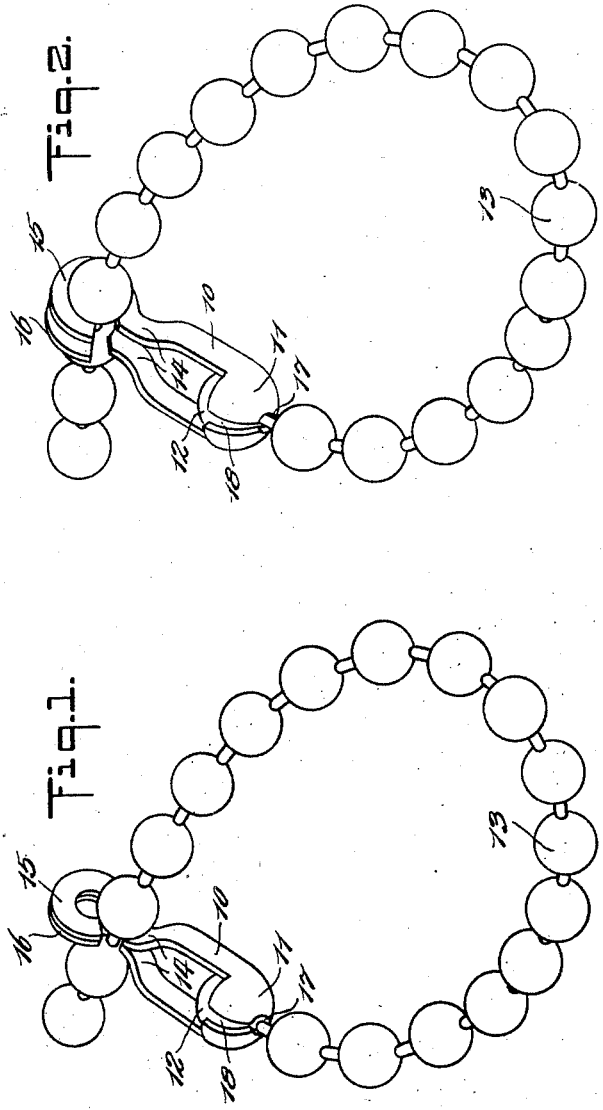
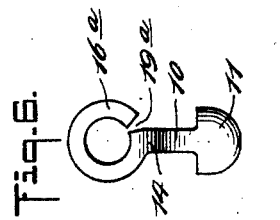
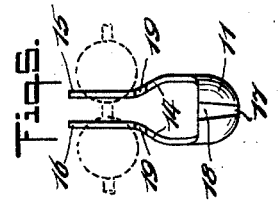
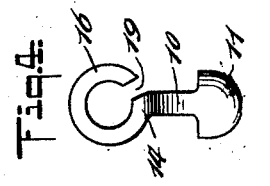
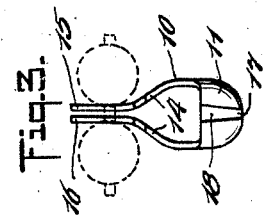
INVENTOR
WILLIAM J. GAGNON
by his attorneys
Howson and Howson Patented July 9, 1929.

1,720,472

UNITED STATES PATENT OFFICE.

WILLIAM J. GAGNON, OF BRIDGEPORT, CONNECTICUT, ASSIGNOR TO THE BEAD CHAIN MANUFACTURING COMPANY, OF BRIDGEPORT, CONNECTICUT, A CORPORATION OF CONNECTICUT.

CHAIN COUPLING.

Application filed December 27, 1928. Serial No. 328,816.

My invention relates to chain couplings particularly such couplings as may be readily attached and detached. An object of the invention is to provide a combined socket and resilient hook adapted to connect an end link with an intermediate point in a chain. A further object is to provide such a coupling which may be easily and economically manufactured. Other objects will appear upon consideration of this specification.

The invention is especially useful in providing a chain loop which may be connected around a faucet or any similar anchorage.

One form of the invention is illustrated by way of example in the accompanying drawings, in which—

Figure 1 is a perspective view of a ball chain assembly in which the coupling is partly connected, Fig. 2 is a perspective view of the same chain assembly with the coupling in connected position, Fig. 3 is a front elevation of this coupling, illustrating how it may be connected with an intermediate point of a chain, Fig. 4 is a side elevation of the coupling, Fig. 5 is a front elevation of the coupling in connected position between two intermediate balls of a ball chain, and Fig. 6 is a side elevation of a slightly modified form of the coupling.

It is frequently desirable to connect a chain end with an intermediate point of the same chain or of a different chain, and it is often preferred to make this connection in a simple, quick and not too permanent fashion. The present invention provides a coupling by means of which such connections may be very quickly and easily made, disconnection being effected with simplicity and rapidity. For this purpose a chain coupling is provided having at one end an open cup with a centrally apertured bottom and slit side. The slit extends from the aperture to the margin of the cup. The coupling is made of resilient material, and resilient integral arms extend from opposite margins of the cup and are hooked at their ends. The ends are preferably offset toward each other above the open end of the cup, but stand normally at an appreciable distance apart, that is to say a distance apart which is greater than the distance between two chain balls.

In the drawings, there is shown a chain coupling 10 having a cupped end 11 for attachment to the end ball 12 of a ball chain 13. A second end 14 of the coupling is formed in two parts 15 and 16 for attachment to an intermediate point on the ball chain 13.

The cupped end 11 is provided with a central aperture 17 in its bottom and a slit 18 extends from the aperture to the margin of the cup. In order to attach the coupling to the end of a ball chain, the end ball 12 is placed within the cup and the adjacent dumb-bell neck is passed through the slit 18 into the central aperture 17 in the bottom of the cup. I may prefer to constrict the slit 18 where it joins the aperture 17 in order that the dumb-bell neck must be forced through the constricted part and when in place be held in position through resistance to expansion of the metal parts of the cup.

The two parts 15 and 16 are hooked, thus forming a hooked end, and the internal diameter of each part is substantially greater than that of a dumb-bell neck, and substantially smaller than the diameter of a chain ball. The hook is curved to a substantial extent leaving an opening 19 which is preferably not much wider than a dumb-bell neck. The two parts 15 and 16 normally stand apart at a distance which is greater than the distance between two chain balls in order to facilitate connection, as will be explained.

The end 14, of the coupling, is attached as follows: The two parts 15 and 16 are pinched together and the end 14 is hooked over an intermediate dumb-bell in the chain. When in place the pinching effort is released and the resiliency of the coupling forces the ends 15 and 16 apart. The interior diameter of the hooks, being larger than the dumb-bell, but smaller than the diameter of the adjacent balls, causes connection to be maintained by pressure of each part 15 and 16 against its adjacent ball. Thus the ball projects partially through the hook as is best seen in Fig. 5 and direct disengagement is resisted by contact over a considerable length between the two balls adjacent the parts 15 and 16.

Because of the resiliency of the parts 15 and 16 tending to force them away from each other, it is necessary to pinch these parts together in order to disconnect the coupling from the intermediate point of the chain. It will thus be seen that the coupling cannot be shaken loose from the chain, although it may be easily disconnected, when it is desired to do so.

I may prefer to construct the hook in such fashion that the dumb-bell neck must be forced into its central opening. Such a construction is illustrated in Fig. 6 of the drawings. This form of coupling provides additional insurance against accidental disconnection.

Couplings in accordance with the invention can be easily and economically manufactured. They can be produced on known forms of ball chain machine.

While the invention has been described and illustrated in its connection with a ball chain, it is not limited to use with such a chain, as will be obvious to those skilled in the art. Further, modifications and changes in construction will readily occur to those dealing with the problem which do not depart from the proper scope of the present invention. With the understanding, therefore, that the invention is not limited to the particular description and illustrations here given by way of example,

I claim:

1. A chain coupling having at one end an open cup with centrally apertured bottom and slit side, the slit extending from said aperture to the margin of the cup, resilient integral arms extending from opposite margins of the cup and hooked at their ends, the ends being offset toward each other above the open end of the cup.

2. A chain coupling having a cupped end for attachment to the end link of a chain, and a second end in two separated parts for attachment to an intermediate point on a chain, said cupped end being adapted to retain the end ball in place through resistance to expansion of the metal parts, said second end being adapted to maintain its position at the intermediate point of the chain through the resiliency of the separated metal parts.

3. A chain coupling for ball chains having a hooked end in two parts, the internal diameter of each part being substantially greater than that of a dumb-bell neck and substantially smaller than a chain ball.

4. A chain coupling comprising a cupped end, two members extending from said cupped end forming a hooked end, said two members being resilient and normally disposed at a distance apart which is greater than the distance between two chain balls and being compressible together until their outside faces are separated by a shorter distance from the distance between two chain balls.

5. A ball chain coupling comprising a slotted cupped part for attachment to the end ball of the chain, and another part formed in two halves for attachment to an intermediate point on the chain, said cupped part being adapted to retain the end ball in place therein by the resistance to being forced apart of the two edges of the slot and said two halves being adapted to retain their position on the intermediate point of the chain by their resistance to being forced together, substantially as described.

6. A chain coupling having a cupped end adapted to receive an enlarged portion of the chain, in combination with a hooked end comprising two hook parts adapted to engage over a reduced portion of the chain and resiliently separated by a greater distance than the space between two enlarged portions of the chain.

In testimony whereof I have signed my name to this specification.

WILLIAM J. GAGNON.